United States Patent
Bush et al.

(10) Patent No.: US 7,376,940 B1
(45) Date of Patent: *May 20, 2008

(54) THREAD SUSPENSION AND METHOD IN A MULTI-THREADED ENVIRONMENT

(75) Inventors: William Bush, San Mateo, CA (US); Mario Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 10/861,704

(22) Filed: Jun. 4, 2004

Related U.S. Application Data

(63) Continuation of application No. 09/229,272, filed on Jan. 13, 1999, now Pat. No. 6,842,853.

(51) Int. Cl.
*G06F 9/45* (2006.01)
*G06F 9/44* (2006.01)

(52) U.S. Cl. .......... 717/149; 717/108; 717/155
(58) Field of Classification Search ............. 717/133, 717/144, 148–156, 108–110
See application file for complete search history.

(56) References Cited

U.S. PATENT DOCUMENTS

| | | | | |
|---|---|---|---|---|
| 4,484,272 A | * | 11/1984 | Green | 717/149 |
| 5,125,092 A | * | 6/1992 | Prener | 717/156 |
| 5,437,037 A | * | 7/1995 | Furuichi | 717/146 |
| 5,692,193 A | * | 11/1997 | Jagannathan et al. | 718/106 |
| 5,832,272 A | * | 11/1998 | Kalantery | 717/149 |
| 5,900,001 A | * | 5/1999 | Wolczko et al. | 707/206 |
| 5,999,987 A | * | 12/1999 | O'Farrell et al. | 719/330 |
| 6,081,665 A | * | 6/2000 | Nilsen et al. | 717/116 |
| 6,115,782 A | * | 9/2000 | Wolczko et al. | 711/100 |
| 6,341,293 B1 | * | 1/2002 | Hennessey | 707/206 |
| 6,493,868 B1 | * | 12/2002 | DaSilva et al. | 717/105 |
| 6,842,853 B1 | * | 1/2005 | Bush et al. | 712/228 |
| 6,845,385 B1 | * | 1/2005 | Hennessey | 707/206 |
| 7,013,454 B2 | * | 3/2006 | Bush et al. | 717/124 |

(Continued)

OTHER PUBLICATIONS

Luo et al, "Performance of a micro threaded pipeline", ACM ACSAC, pp. 83-90. 2002.*
Kim et al, "Physical experimentation with prefetching helper threads on Intel's Hyper Threaded Processor", IEEE CGO, pp. 1-12, 2004.*

(Continued)

*Primary Examiner*—Anil Khatri
(74) *Attorney, Agent, or Firm*—Osha•Liang LLP

(57) ABSTRACT

Mechanisms can be used to facilitate suspension of a mutator thread (or mutator threads) while imposing negligible overhead on the mutator computation during periods when thread suspension is not requested. Mechanisms are provided to spill values from a fixed set of resources to a secondary store and to fill values from the secondary store into the fixed set in correspondence with function call triggered overflows and function return triggered underflows. In some configurations, modified spill and/or fill mechanism(s) are used to suspend threads at safe points coinciding with call and/or return sites. Because the modified spill and/or fill mechanism(s) impose negligible overhead when not employed and can be engaged in response to an event (e.g., a start garbage collection event), safe points can be defined at call and/or return points throughout mutator code to reduce the latency between the event and suspension of threads.

17 Claims, 4 Drawing Sheets

U.S. PATENT DOCUMENTS

| | | | |
|---|---|---|---|
| 7,058,929 B2 * | 6/2006 | Charnell et al. | 717/135 |
| 7,107,580 B2 * | 9/2006 | Zemach et al. | 717/136 |
| 7,111,290 B1 * | 9/2006 | Yates et al. | 717/158 |
| 7,137,110 B1 * | 11/2006 | Reese et al. | 717/158 |
| 7,159,211 B2 * | 1/2007 | Jalan et al. | 717/149 |

OTHER PUBLICATIONS

Govindarajan et al, "Timed petri net models of multithreaded multiprocessor architectures", IEEE, pp. 153-162, 1997.*

Jacobs, "Single threaded specification of process interaction formalism in Java", ACM, pp. 1-8, 2004.*

* cited by examiner

THREAD SUSPENSION AND METHOD IN A MULTI-THREADED ENVIRONMENT

CROSS-REFERENCE TO RELATED APPLICATION(S)

This non-provisional patent application is a continuation of U.S. patent application Ser. No. 09/229,272, filed on Jan. 13, 1999, and naming William Bush and Mario Wolczko as inventors.

BACKGROUND

The present invention relates to coordination amongst execution sequences in computer programs and, more particularly, to techniques for facilitating garbage collection in multi-threaded software environments.

DESCRIPTION OF THE RELATED ART

Traditionally, most programming languages have placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Pascal and C++ languages provide analogous facilities for explicit allocation and deallocation of memory.

Unfortunately, dynamically allocated storage becomes unreachable when no chain of references (or pointers) can be traced from a "root set" of references (or pointers) to the storage. Memory objects that are no longer reachable, but have not been freed, are called garbage. Similarly, storage associated with a memory object can be deallocated while still referenced. In this case, a dangling reference has been created. In general, dynamic memory can be hard to manage correctly. In most programming languages, heap allocation is required for data structures that survive the procedure that created them. If these data structures are passed to further procedures or functions, it may be difficult or impossible for the programmer or compiler to determine the point at which it is safe to deallocate them.

Because of this difficulty, garbage collection, i.e., automatic reclamation of heap-allocated storage after its last use by a program, can be an attractive alternative model of dynamic memory management. Garbage collection is particularly attractive for languages such as the JAVA™ language (JAVA and all Java-based marks and logos are trademarks or registered trademarks of Sun Microsystems, Inc. in the United States and other countries), Prolog, Lisp, Smalltalk, Scheme, Eiffel, Dylan, ML, Haskell, Miranda, Oberon, etc. See generally, Jones & Lins, *Garbage Collection: Algorithms for Automatic Dynamic Memory Management*, pp. 1-41, Wiley (1996) for a discussion of garbage collection and of various classical algorithms for performing garbage collection.

In general, garbage collection methods can be described with reference to a garbage collection strategy implemented by a "collector" and its interaction or coordination with a useful computation—a "mutator"—that changes the state of heap-allocated storage. Many collector implementations, including some mark-sweep and copying collector implementations, are based on a stop-start approach, i.e., they involve suspending the mutator, collecting garbage, and resuming execution of the mutator after garbage collection. In such implementations, garbage collection is performed when the "root set" of pointers to dynamically allocated memory locations referenceable by the mutator is available to the garbage collector. A mutator in this state is called "consistent," and one that is not is "inconsistent."

Typically, a compiler for a garbage-collected language supports the collector by generating code that allocates objects, by describing storage locations that make up the root set, and by describing the layout of objects allocated from the heap. For efficiency, compilers typically generate code that uses registers and/or stack locations provided by a target processor architecture. As a result, execution of compiled code puts pointers in such registers or stack locations. Unfortunately, a mutator running such code is generally inconsistent, because the exact set of registers and/or stack locations containing pointers can change with every instruction. The overhead of exactly maintaining a root set description at each instruction tends to defeat the purpose of using registers and stack locations in the first place. Compilers therefore identify safe points in the code, places in the code where the compiler emits information describing which registers and stack locations contain pointers. When a mutator is suspended at a safe point it is consistent and hence garbage collection can proceed. See generally, Appel, *Modern Compiler Implementation in C: Basic Techniques*, pp. 291-297, Cambridge University Press (1998) for a description of compiler support for garbage collection.

Accordingly, a mechanism is desired by which a processor executing mutator code may suspend execution at a safe point defined therein to facilitate garbage collection. A desirable mechanism is computationally efficient and imposes minimal overhead on the mutator computation. Furthermore, it is desirable for the mechanism to operate in the context of multi-threaded mutator computation and to limit the delay between a request to start garbage collection and suspension of all threads of the mutator computation.

SUMMARY

It has been discovered that in processor architectures that support allocation of register windows to called procedures, functions or methods, register windowing mechanisms can be used to facilitate suspension of a mutator thread (or mutator threads) while imposing negligible overhead on the mutator computation during periods when thread suspension is not requested. Reduced Instruction Set Computer-(RISC)-oriented processor architectures often employ register windows (typically, partially-overlapped register windows) and can therefore benefit from the discovered technique. Furthermore, variations on the discovered technique can be employed even in processors (RISC or otherwise) that do not employ register windowing as long as the processor (by itself or in cooperation with software) provides facilities for allocating and reclaiming a fixed set of resources in correspondence with calls to, and returns from, procedures, functions or methods (hereafter and generally, "functions").

Because calling depth can be great (i.e., a given function may call another, and so on, and so on) mechanisms are provided to spill values from the fixed set of resources to a secondary store and to fill values from the secondary store into the fixed set in correspondence with function call triggered overflows and function return triggered underflows. Illustrative embodiments in accordance with the present invention exploit modified spill and/or fill mechanism(s) to suspend threads at safe points coinciding with call and/or return sites. Other illustrative embodiments in accordance with the present invention build on modified overflow and/or underflow handling to suspend threads at safe points coinciding with call and/or return sites.

Because the mechanism(s) impose negligible overhead when not employed and can be engaged in response to an event (e.g., a start garbage collection event), safe points can be defined at call and/or return points throughout mutator code to reduce the latency between the event and suspension of all threads. In contrast, mechanisms based on conditional execution of suspension code can impose substantial overhead. Furthermore, unlike mechanisms based on self-modifying code, complexities associated with maintaining memory model consistency are avoided. Though particularly advantageous for thread suspension to perform garbage collection at safe points, the techniques described herein are more generally applicable to program suspension at coordination points coinciding with calls, returns, or calls and returns therein.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

To facilitate garbage collection it is desirable to provide a mechanism by which threads of a mutator can be efficiently suspended at safe points. Conditional execution of suspension code at such safe points is one technique. For example, at selected safe points in mutator code, a compiler can insert instructions that check a flag that is set when garbage collection is desired and cleared when the garbage collection has completed. If the flag is set, the suspension code is run to suspend the mutator. This technique can be described as "polling at safe points." Unfortunately, the polling technique introduces substantial overhead. A flag test must be performed at every safe point and millions of safe points will typically be traversed between garbage collection cycles. Extra flag test and branch instructions degrade performance, increase code size and consume processor resources such as instruction cache space and flags.

Another technique involves self-modifying code. When garbage collection becomes necessary or is desired, all threads are suspended, and every currently executing method (i.e., the code associated with each suspended thread) is patched so that when execution is resumed each method will suspend itself at the next safe point. After all threads are suspended, the patches are removed. This technique can be described as "patching the safe points." Unfortunately, dynamic code modifications are complex and often error prone, especially on a multiprocessor. In particular, memory maps or similar data structures should be provided to encode locations where code patches are to be made and instruction caches should flushed upon patching to ensure memory consistency. In addition, processor pipelines may stall due to store into instruction stream handling. For these reasons, applying and removing patches can impose significant overhead. Since multi-threaded computations may be particularly amenable to multiprocessor implementations, avoiding the complexity and overhead of properly handling self-modifying code is desirable.

Dynamically Allocated Memory and Safe Points

Figure 1:
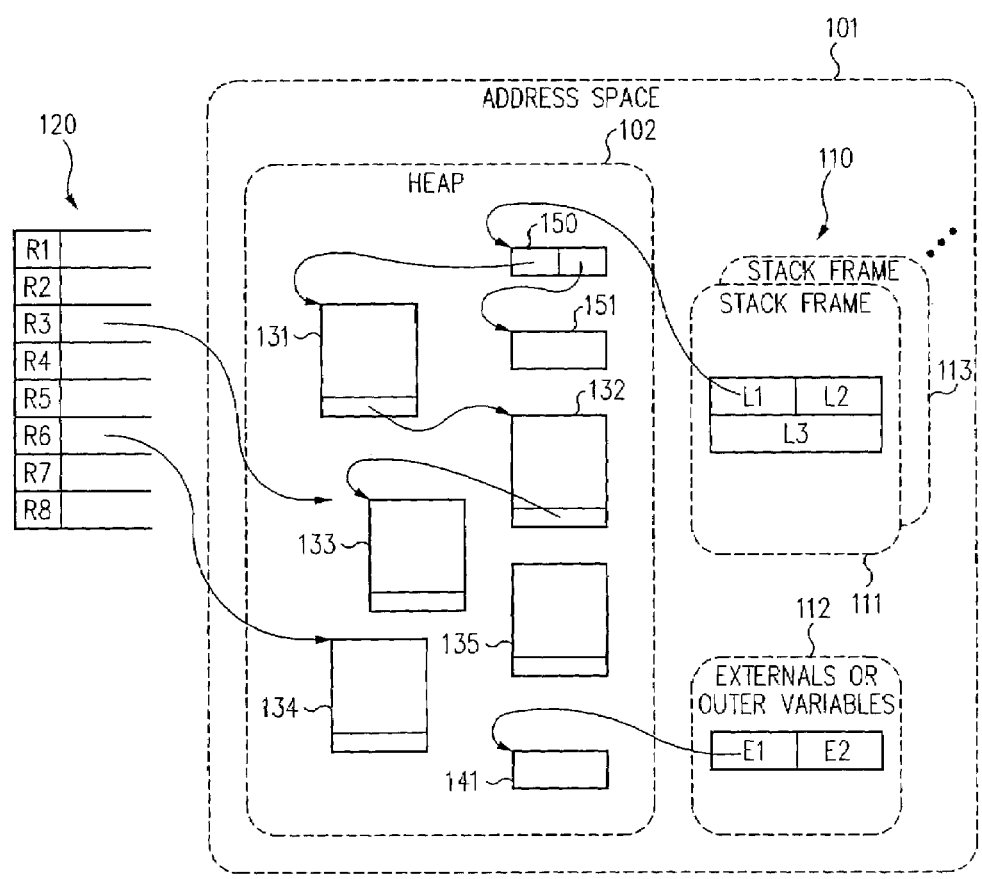
FIG. 1 depicts a referencing graph for an illustrative mutator having a root set of pointers at least partially represented in registers or stack locations.

FIG. 1 depicts a partial referencing graph for an illustrative mutator thread executing on a processor having memory referenceable as address space 101. The mutator thread is at a current function corresponding to stack frame 111 in a calling hierarchy represented as activation record stack 110. Activation record stack 110 and stack frame 111 are described in greater detail below. A register context 120 is associated with the current function. As described below, register context 120 may be a full set of machine registers available to the mutator thread or a window into a subset of machine registers allocated to the current function. A portion of address space 101 is dynamically allocable as heap 102. Individual memory objects (e.g., objects 150, 151, 131, 132, 133, 134 and 141) are dynamically allocated from heap 102 and, in the referencing graph of FIG. 1, are currently reachable by a set of pointers including local variable L1, external or outer variable E1, and contents of registers R3 and R6 of register context 120. Register context 120 may include a portion organized as a stack. In some configurations, a register context and frame for a particular function may combined in a unified storage arrangement.

Memory object 135 represents dynamically allocated storage that is no longer reachable and will be collected and returned to a free space pool of heap 102 by garbage collection. Referencing graphs for pointers represented in other stack frames in the calling hierarchy (e.g., stack frame 112) or represented in other register contexts are omitted for clarity and only the partial referencing graph associated with the current function is shown. However, based on the description herein, persons of ordinary skill in the art will appreciate that at any given point in the execution and calling sequence of the mutator thread, a complete set of reachable objects in heap 102 and a root set of pointers thereto can be defined by combining the contributions for each function in the calling hierarchy. Memory object 135 is not reachable from the root set and is therefore garbage to be collected.

As described above, a root set of pointers at least partially represented in registers or stack locations necessitates some method of tracking of those registers or stack locations containing valid pointers. Tracking can be continuous with significant overhead or, more preferably, can be limited to predefined safe points in the mutator code. If predefined safe points are utilized, attractive safe points must be identified and a mechanism for suspending a mutator thread (or threads) at such safe points is needed. When a thread is suspended, all the stack frames except the most recently entered (i.e., all the calling functions in the calling hierarchy) must be at call sites; hence every call site must be a safe point. Therefore, mutator code should at least include information describing the registers and/or stack locations containing pointers at call sites. In addition, other safe points may be defined to reduce the period during which a thread executes with garbage collection pending. For example, returns from functions are another likely safe point site.

For safe points defined at call sites or at call and return sites, spill or spill and fill operations performed by a register window management mechanism or by a stack frame management mechanism contribute to an efficient mechanism for advancing mutator threads to safe points. Stack frame and register window management mechanisms are now described together with modifications to facilitate advancing mutator threads to safe points.

Stack Frames

Execution of a computer process involves a calling hierarchy of procedures, functions, routines or methods, the local context of which is represented in a corresponding frame. Although the terms procedure, function, routine and method may have distinct meanings in other contexts, for purposes of this description, calling and called software objects are referred to as calling functions and called functions without loss of generality. Sequences of calls to and returns from functions can be managed using a last in, first out data structure (or stack) of frames.

In FIG. 1, the context for a called function g ( ) is pushed onto an activation record stack 110 as stack frame 111. If and when the called function, g ( ), calls another function, the context of the subsequently called function, h ( ), will be pushed onto stack 110 as a new stack frame (not shown). Correspondingly, when called function g ( ) returns, stack frame 111 will be popped from activation record stack 110, leaving the context its calling function, f ( ), (which is represented in stack frame 113) at the top of stack 110. Typically, stack frames will include local variables, return addresses, temporaries, outgoing arguments, saved register values, static links to external or outer variable storage locations, etc. Organization and operation of activation record stacks and stack frames is well known and, based on the description herein, suitable designs will be appreciated by persons of ordinary skill in the art. See generally, Appel, *Modern Compiler Implementation in C: Basic Techniques*, pp. 125-149, Cambridge University Press (1998).

In some activation record stack configurations, register values for a calling function can be saved in the calling function's stack frame. Similarly, parameter and result passing between calling and called functions may be provided using storage locations in stack frames. However, in other configurations, calling function register value storage can be provided by a register windowing scheme, which if overlapped, may also provide in-register passing of parameters and results between calling and called functions.

Register Windows

Although code compiled for some processor architectures, e.g., those conforming to the x86 instruction set, may make use of stack frames for saving register values associated with a calling function's context, many modern processor architectures have large sets of machine registers from which a fresh "window" of registers can be allocated for each called function. Register windows provide two important benefits. First, they allow the processor to forgo the overhead of including register values in a stack frame such as stack frame 111. Second, when configured with overlap between a calling function's register window and a called function's register window, call arguments and return values can be easily passed between calling and called functions. In a processor architecture providing register windowing, calls to and returns from functions trigger a stack frame management operation and register window management operation coincident with the call or return.

Figure 2:
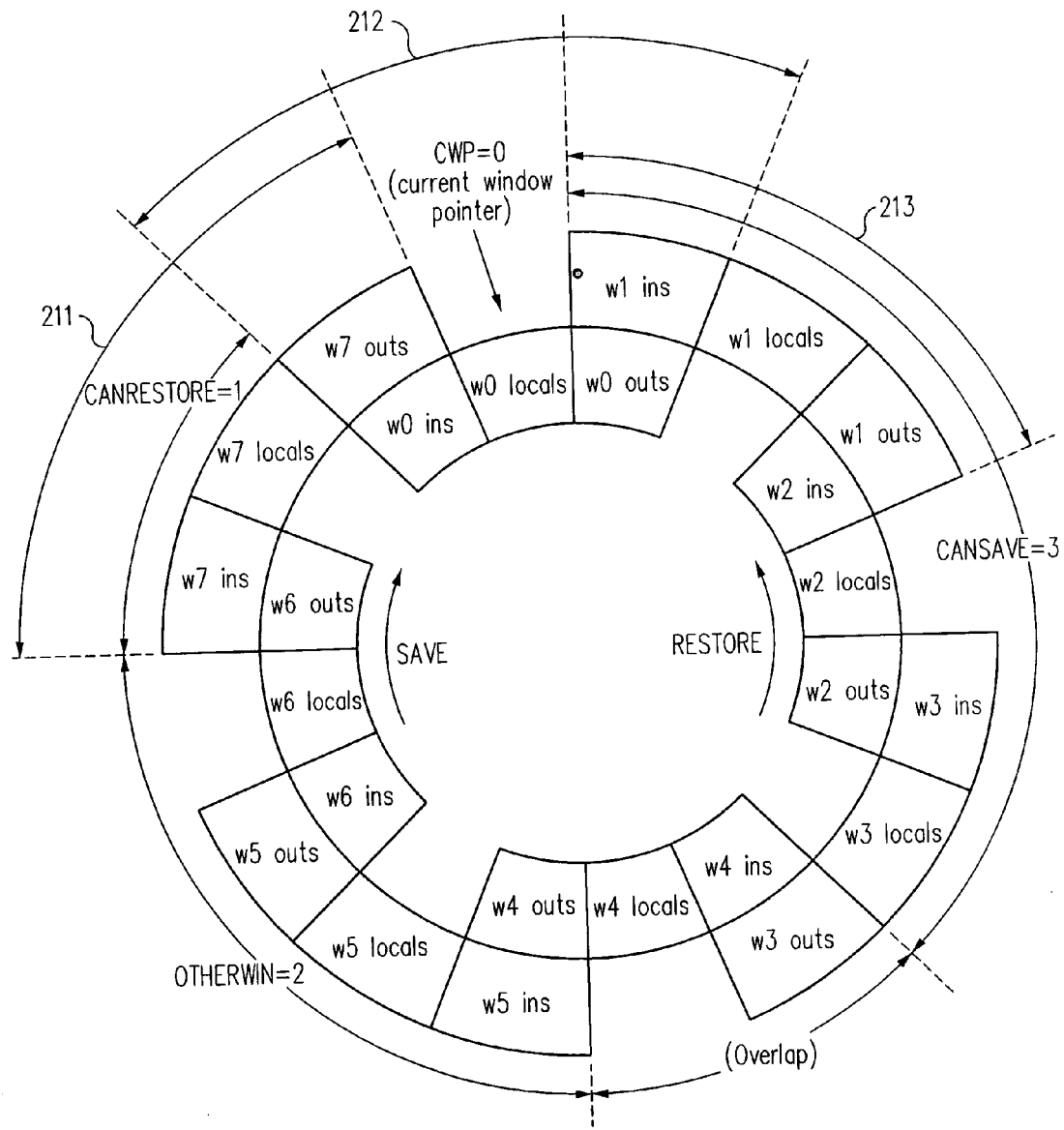
FIG. 2 depicts an illustrative overlapped register window scheme of an illustrative processor architecture.

FIG. 2 depicts an overlapped register window allocation state illustrative of certain SPARC® architecture based processors available from Sun Microsystems, Inc, Mountain View, Calif. SPARC trademarks are used under license and are trademarks or registered trademarks of SPARC International, Inc. in the United States and other countries. Products bearing SPARC trademarks are based upon an architecture developed by Sun Microsystems. At any time, an instruction associated with the current function in a calling hierarchy can access an N-register window into R physical registers defined by a particular SPARC processor implementation. Numbers of physical registers are implementation specific but always finite. Therefore, a call depth can always be defined for which physical registers are exhausted. To virtualize larger sets of logical registers, the physical register set can be managed as a circular queue, as illustrated in FIG. 2. In the exemplary state of FIG. 2, register windows include input registers, local registers and output registers where the output registers of a register window associated with a calling function, e.g., output registers w7 outs of register window 211, overlap with input registers of a called function, e.g., input registers w0 ins of register window 212.

The current window into the R registers is identified by contents of a Current Window Pointer (CWP) register, which in the state of FIG. 2, identifies register window 212. The value stored in the CWP register is incremented by a SAVE instruction and decremented by a RESTORE instruction. Execution of a SAVE instruction coincides with performance of a function call, whereas execution of a RESTORE instruction coincides with performance of a return from a called function. Window overflow is detected using a CANSAVE register and window underflow is detected using a CANRESTORE register, both of which can be controlled by privileged software. A window overflow condition occurs when a SAVE instruction is executed and the next register window is occupied (CANSAVE=0). Such an overflow causes a window_spill exception that triggers a spill trap handler that saves the occupied register window in memory. A window underflow condition occurs when a RESTORE instruction is executed and the previous register window is not valid (CANRESTORE=0). Such an underflow causes a window_fill exception that triggers a fill trap handler that loads the previously spilled register window from memory.

In the arrangement of FIG. 2, tracking of register windows available for saving to or restoring from is provided by count values stored in CANSAVE and CANRESTORE registers, respectively. However, many other encodings are possible. For example, a mask may be defined (e.g., in a register window mask register) wherein individual portions of the mask (e.g., bits) are used to encode availability and validity of physical registers (or groups of physical registers) in physical memory. As before, a window overflow condition occurs when a SAVE instruction is executed and the next register window is indicated as occupied, and a window underflow condition occurs when a RESTORE instruction is executed and the previous register window is indicated as not valid.

Thread Suspension using Spill and/or Fill Traps

Figure 3:
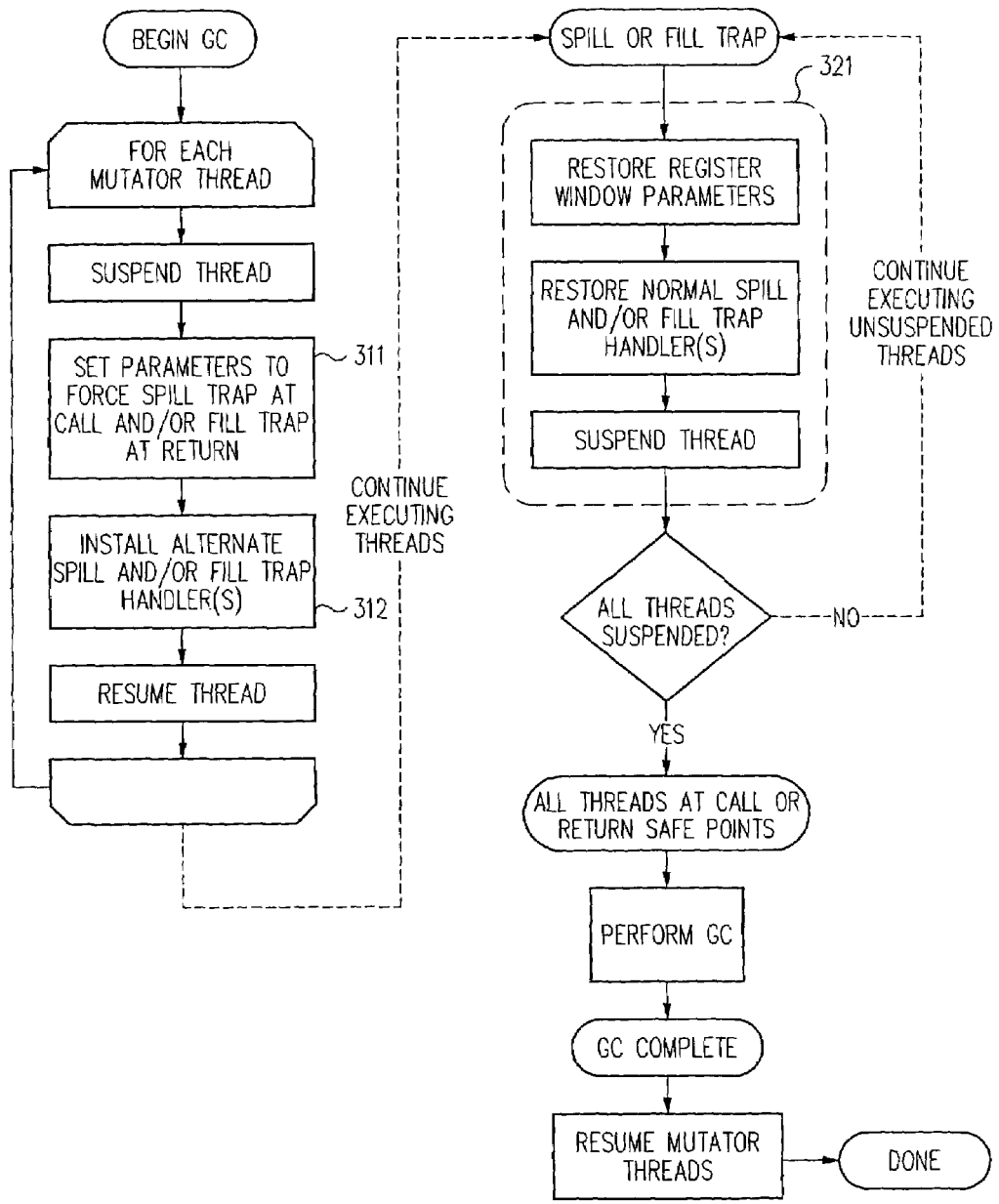
FIG. 3 depicts a flowchart in accordance with an exemplary embodiment of the present invention wherein register window parameters are manipulated and spill and/or fill traps are exploited to advance each thread of a mutator process to a safe point for garbage collection.

FIG. 3 illustrates an exemplary technique for using spill and fill traps to catch a call or return encountered by a mutator thread after a begin garbage collection event. If mutator code has been defined (e.g., compiled) such that call and return sites are safe points, spill and fill trap handlers can suspend mutator threads when triggered at call or return sites corresponding to safe points, thereby ensuring consistent threads for garbage collection. The exemplary technique includes suspending each potentially inconsistent mutator thread, and for each suspended mutator thread, setting register window parameters to define the next register window as occupied and the previous register window as not valid. In the context of a FIG. 2 style register windowing mechanism, CANSAVE and CANRESTORE registers are both set to zero, although other register windowing mechanisms, including register window mask manipulations, are also suitable. For example, in an exemplary register window mask based configuration, mask bits are set to indicate that the next and previous windows are either occupied or invalid so that a spill or fill exception will be generated in response to a subsequent call or return.

In either case, alternate spill and fill trap handlers are made active (e.g., by storing an alternate handler address into spill and fill exception vector registers) and each suspended mutator thread is resumed. In some processor architectures multiple handler addresses may be provided for a given exception. In such cases, one of the handler addresses can be used to vector to the alternate spill (or fill) trap handler and selected as active to support the thread suspension described herein. In processor architectures that provide only a single handler address store per exception, the alternate spill and fill trap handler addresses can be stored in the corresponding single stores. To facilitate later restoration of the default handler addresses and register window parameters, prior (i.e., normal) values for each may be temporarily stored for later restoration.

For efficiency, suspension of a thread, modification of associated register window parameters and installation of associated alternate spill and fill trap handlers are preferably performed sequentially for each thread of a mutator process. However, other orderings of operations are also possible. For example, all potentially inconsistent mutator threads may be suspended before modification of associated register window parameters and installation of associated alternate spill and fill trap handlers. Also, concurrent handling of multiple threads may be appropriate in some processor architectures including multiprocessor configurations. Furthermore, for some instances of mutator code, only a subset of mutator threads may be potentially inconsistent while other threads may be guaranteed consistent (e.g., they may not utilize temporary storage). In such cases, only the potentially inconsistent subset of mutator threads need be suspended for modification of associated register window parameters and installation of associated alternate spill and fill trap handlers. Whatever the particular mutator code configuration or ordering of operations, for the particular configuration now described, each potentially inconsistent thread of the mutator process is suspended, has associated register window parameters modified and associated alternate spill and fill trap handlers installed, and is resumed.

As the current functions of individual mutator threads call or return, the alternate spill or fill trap handlers are invoked as is now explained in the context of the register window configuration of FIG. 2. A calling function executes a CALL instruction and a window SAVE instruction. Because the value of the CANSAVE register has been set to zero in step 311, a window_spill exception is generated that vectors to the alternate spill trap handler made active in step 312. Correspondingly, in the case of a returning function, a RETURN instruction and a window RESTORE instruction are executed. Because the value of the CANRESTORE register has been set to zero in step 311, a window_fill exception is generated that vectors to the alternate fill trap handler made active in step 312.

In some configurations in accordance with the present invention, spill and fill trap handling are provided by a single alternate spill and fill trap handler. In other configurations, separate alternate handlers are provided. In one configuration in accordance with FIG. 3, an alternate spill and fill trap handler 321 restores register window parameters, restores normal spill and fill trap handler vectors and suspends the trapping mutator thread. Because the spill or fill corresponds to a call or return, the suspended thread is at a safe point. Unsuspended threads of the mutator process continue executing until they also execute a SAVE or RESTORE instruction (as part of a call or return), at which point a spill or fill exception is triggered, vectoring to the alternate spill and fill trap handler, and suspending the thread at a safe point. Eventually, all threads of a mutator process are suspended at safe points and garbage collection can be performed. After garbage collection is completed, each of the mutator threads can be resumed. In one configuration in accordance with the present invention, threads are resumed by RETRYing the trapping instruction. Because register window structures and normal trap handlers have been restored, the SAVE or RESTORE instruction is now handled normally.

Although spill/fill trap mediated thread suspension mechanisms are envisioned for various processor architectures and processor call/return handling mechanisms, including register window based mechanisms and activation record stack mechanisms, a description in the context of mechanisms and facilities provided by a SPARC processor running the SOLARIS™ 2.0 operating system is illustrative. In the SPARC architecture a register window oriented spill and fill trap mechanism is provided (as described above). The mechanism involves filling one register window with the thread's saved register values, setting that window, and no other, to be valid, and then resuming execution. Fill window traps then fill in the rest of the thread's register windows, as needed. The SOLARIS operating system provides a facility for resuming a thread (and initiating the above sequence of events) by making a setcontext system call. The setcontext system call modifies privileged registers including CANSAVE and CANRESTORE. A similar mechanism may be used to perform the above-described register window parameter manipulations. Alternatively, the setcontext system call could be extended with additional arguments so that, when desired, it would perform the CANSAVE and CANRESTORE zeroing and install the desired alternate trap handlers before resuming the thread. Later restoration of the CANSAVE and CANRESTORE register values may be performed similarly or, alternatively, normal trap handling can be restored and register window state (including CANSAVE and CANRESTORE register values) can be rebuilt through normal operation of spill and/or fill trap handlers.

Although some embodiments in accordance with the present invention include both spill and fill trap handling, others may provide thread suspension on calls but not returns (i.e., using spill trap handling but not fill trap handling) or on returns but not calls (i.e., using fill trap handling but not spill trap handling). In the former case, at least calls in potentially inconsistent mutator code should be defined as safe points; whereas in the latter case, both calls and returns in potentially inconsistent mutator code should be defined as safe points. In some embodiments, trap handling at returns may advance thread state past the return and back to the calling-function's call site (i.e., to a safe point) such that return sites need not be defined as safe points.

Furthermore, although register window-based spill and/or fill trap mechanisms have been described, alternative spill and/or fill trap mechanisms are envisioned based on other processor data structures that are, or may be, call and/or return driven. For example, activation record stacks (recall FIG. 1) may be provided in which a finite set of stack frames is maintained in primary storage. In such configurations, primary stack frame storage may be represented as a circular queue with spills and fills to virtualize logical stack frame storage suitable for large call depths.

Referring back to FIG. 3, if mutator code has been defined (e.g., compiled) such that call and return sites are safe points, spill and fill trap handlers (in this case, stack frame handlers) can suspend mutator threads when triggered at call or return sites corresponding to safe points, thereby ensuring consistent threads for garbage collection. The exemplary technique includes suspending each potentially inconsistent mutator thread, and for each suspended mutator thread, setting activation record stack parameters to define the next stack frame as occupied and the previous stack frame as not valid. A variety of stack frame windowing mechanisms are suitable. For example, in processor configurations that maintain activation records in a circular stack, CANSAVE and/or CANRESTORE registers (as in the above-described register windowing mechanisms) or mask bits set to indicate that next and previous stack frames are either occupied or invalid are both suitable. As with the register windowing mechanisms, alternate spill and fill trap handlers are made active (e.g., by storing an alternate handler address into spill and fill exception vector registers) and each suspended mutator thread is resumed.

As with the above-described register windowing mechanisms, current functions of individual mutator threads call or return, invoking the alternate spill or fill trap handlers. A calling function executes a CALL instruction and a window SAVE instruction. Because the value of the CANSAVE register associated with activation record stack management has been set to zero in step 311, a window_spill exception is generated that vectors to the alternate spill trap handler made active in step 312. Correspondingly, in the case of a returning function, a RETURN instruction and a window RESTORE instruction are executed. Because the value of the CANRESTORE register associated with activation record stack management has been set to zero in step 311, a window_fill exception is generated that vectors to the alternate fill trap handler made active in step 312.

Alternatively, in processor configurations that maintain activation records in a more traditional linear stack, overflow and/or underflow of the activation record stack can be exploited. For example, activation record stack BASE and BOUND registers can be modified to trigger stack overflow on allocation (PUSH) of a new stack frame coinciding with a function call and to trigger stack underflow on POP of the current stack frame coinciding with a function return. As with the above-described register windowing mechanisms, current functions of individual mutator threads call or return, invoking the corresponding alternate trap handlers. A calling function executes a CALL instruction and an activation record PUSH instruction. Because the value of the BOUND (or STACK_OVERFLOW) register has been modified to indicate no available headroom for activation record stack growth, an exception is generated that vectors to an alternate overflow trap handler previously made active. Correspondingly, in the case of a returning function, a RETURN instruction and an activation record POP instruction are executed. Because the value of the BASE (or STACK_UNDERFLOW) register has been modified to indicate no additional activation record stack frames, an exception is generated that vectors to an alternate underflow trap handler previously made active.

Suitable activation record stack based configurations are analogous to the register windowing mechanism based configurations described herein. Based on the description herein, suitable modifications to register windowing mechanism based configurations (including use of activation record stack registers and trap handler facilities and trapping values rather than corresponding windowing register and trap handling facilities and values) will be apparent to persons of ordinary skill in the art.

Figure 4:
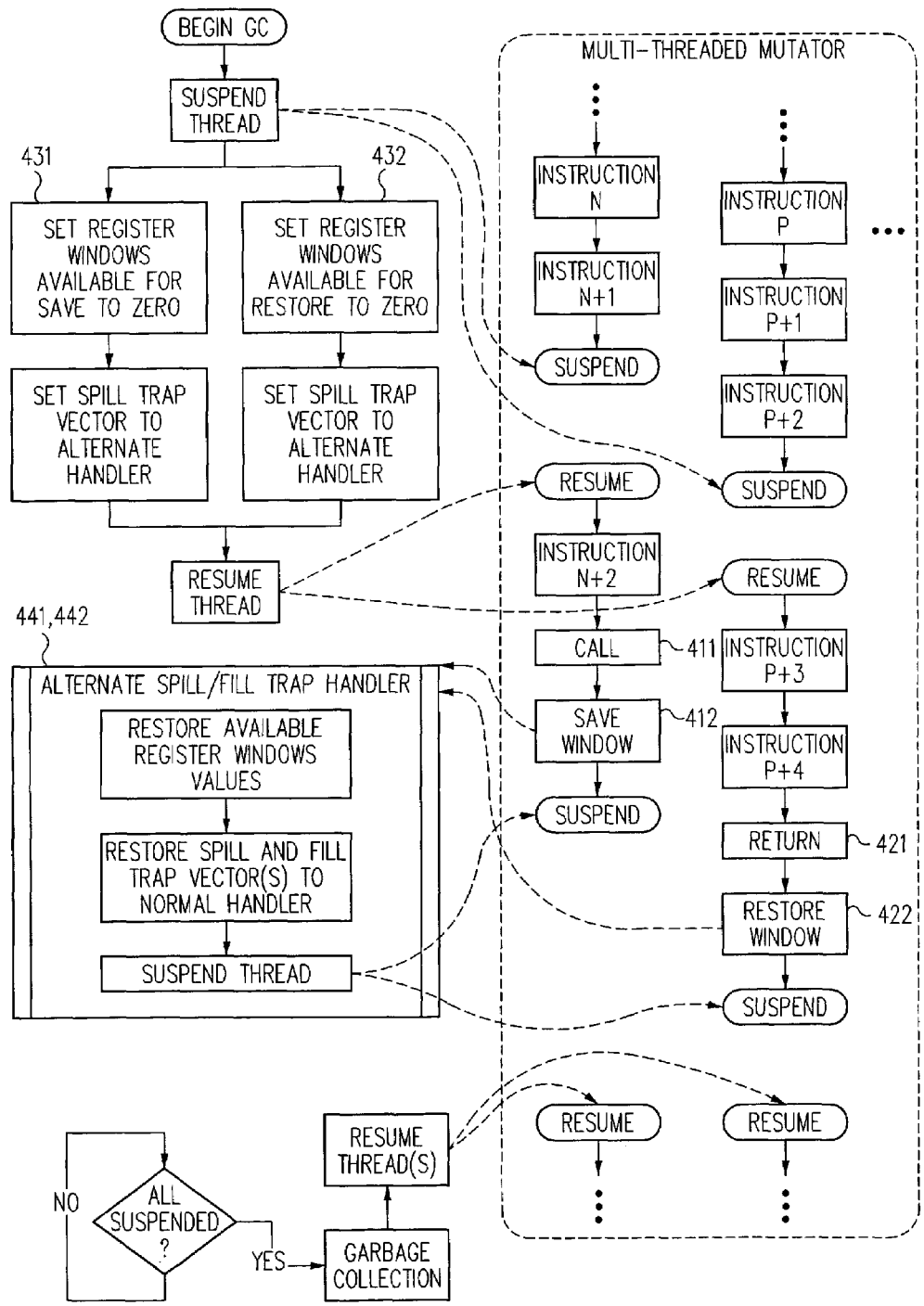
FIG. 4 depicts a flowchart in accordance with an exemplary embodiment of the present invention wherein interactions between a process embodying a garbage collector, a thread suspension mechanism and a multi-threaded mutator are illustrated.

Referring now to FIG. 4, interaction of a particular register windowing mechanism based embodiment with a two-threaded mutator process is illustrated in greater detail. In the particular embodiment of FIG. 4, both spill and fill handling is provided such that both function calls (e.g., as implemented by CALL and SAVE instructions 411 and 412) and function returns (e.g., as implemented by RETURN and RESTORE instructions 421 and 422) are handled. In particular, because the number of register windows available for SAVE was set to zero in step 431, SAVE instruction 412 causes a spill trap. Similarly, because the number of register windows available for RESTORE was set to zero in step 432, RESTORE instruction 422 causes a fill trap. Respective spill and fill trap handler software 441 and 442 restore register window variables (e.g., CANSAVE and CANRESTORE) and active spill and fill trap vectors to normal values and suspend the trapping thread, which is now at a safe point.

Garbage Collection Embodiments

One particularly advantageous exploitation of thread suspension techniques described herein is for facilitating garbage collection. As described herein, garbage collection is exemplary of any of a number of specific implementations implementing any of a number of garbage collection methods. By way of example and not limitation, two suitable tracing collector methods are now summarized. In general, tracing methods involve traversal of reference chains through memory to identify live, i.e., referenceable, memory objects. One such tracing collector method is the mark-sweep method in which reference chains through memory are traversed to identify and mark live memory objects. Unmarked memory objects are garbage and are collected and returned to the free pool during a separate sweep phase. A mark-sweep garbage collector implementation typically includes an additional field, e.g., a mark bit, in each memory object. Mark-compact collectors add compaction to the traditional mark-sweep approach. Compaction relocates live objects to achieve beneficial reductions in fragmentation.

Another tracing method, copying collection, divides memory (or a portion thereof) into two semi-spaces, one containing current data and the other containing old data. Copying garbage collection begins by reversing the roles of the two semi-spaces. The copying collector then traverses the live objects in the old semi-space, FromSpace, copying reachable objects into the new semi-space, ToSpace. After all the live objects in FromSpace have been traversed and copied, a replica of the data structures exists in ToSpace. In essence, a copying collector scavenges live objects from amongst the garbage. A beneficial side effect of copying collection is that live objects are compacted into ToSpace, thereby reducing fragmentation.

Other Embodiments

While the invention has been described with reference to various embodiments, it will be understood that these embodiments are illustrative and that the scope of the invention is not limited to them. Many variations, modifications, additions, and improvements of the embodiments described are possible. For example, in some embodiments, safe points may be defined at both call and return sites in mutator code. Nonetheless, in other embodiments call sites may be used without requiring that return sites be safe points. In some embodiments, both spill and fill traps may be used, whereas in others, either spill traps or fill traps may be used. While embodiments have been described where distinct normal and alternate handlers are provided, a single handler having normal and alternate operating modes would also be suitable. Additionally, while some processor architectures may separate portions of calling function and returning function handling (e.g., into execution of CALL and SAVE instructions and RETURN and RESTORE instructions, respectively), other processor architectures may define calling and or returning function handling using single or different instructions. Based on the description herein, persons of ordinary skill in the art will appreciate processor-specific variations to the instruction(s) triggering spill and/or fill traps.

Furthermore, although certain exemplary embodiments have been described in the context of facilitating garbage collection, the thread suspension techniques and mechanisms described herein are more generally applicable to the problem of coordination amongst execution sequences in programs. In general, any application for which suspension of multiple execution sequences at coordination points coinciding with call and/or return sites therein may advantageously employ the thread suspension techniques and mechanisms described herein. Exemplary applications include synchronization, memory consistency management, termination detection, garbage collection, etc. While much of the description herein has been in the context of multi-threaded mutators, use of the term thread does not require multiple-threads. Indeed, non-threaded or single-threaded processes may also fall within the scope of some claims.

More generally, structures and functionality presented as hardware in the exemplary embodiment may be implemented as software, firmware, or microcode in alternative embodiments. These and other variations, modifications, additions, and improvements may fall within the scope of the invention as defined in the claims that follow.

What is claimed is:

1. A method of advancing a thread to a safe point in an execution path thereof, said method comprising:
   suspending execution of said thread;
   modifying a processor data structure associated with said thread to trigger an exception upon one of a call to and a return from a current function of said thread;
   resuming execution of said thread; and
   upon said one of said call to and said return from said current function, suspending execution of said thread, said one of said call to and said return from said current function coinciding with said safe point,
   wherein said processor data structure includes a register window data structure,
   wherein said modifying said processor data structure includes defining a register state of said register window data structure to mark a next register window as occupied and a previous register window as not valid,
   wherein said call to said current function causes a register window allocation operation that triggers a register window spill exception, and
   wherein said return from said current function causes a register window restore operation that triggers a register window fill exception.

2. A method, as recited in claim 1,
   wherein said processor data structure includes an activation record stack;
   wherein said modifying said processor data structure includes defining a register state associated with said activation record stack to mark a next activation record as unavailable and a previous activation record as not valid;
   wherein said call causes a push activation record operation that triggers an activation record stack overflow exception for performing said suspending; and
   wherein said return causes a pop activation record operation that triggers an activation record stack overflow exception for performing said suspending.

3. A method of advancing plural threads to coordination points in respective execution paths thereof, said method comprising:
   suspending execution of said plural threads;
   modifying processor data structures associated with each of said plural threads to trigger an exception upon one of a call and a return;
   resuming execution of said suspended plural threads; and
   upon said one of said call and said return, suspending execution of said plural threads, said one of said call and said return coinciding with one of said coordination points in said respective execution paths,
   wherein one of said processor data structures includes a register window data structure,
   wherein said modifying said processor data structures includes defining a register state of said register window data structure to mark a next register window as occupied and a previous register window as not valid,
   wherein said call causes a register window allocation operation that triggers a register window spill exception, and
   wherein said return causes a register window restore operation that triggers a register window fill exception.

4. A method, as recited in claim 3, wherein said coordination points include synchronization points for thread state synchronization amongst said plural threads.

5. A method, as recited in claim 3, wherein said coordination points include safe points at which respective of said plural threads have a consistent state.

6. A method, as recited in claim 3, wherein said coordination points include safe points at which information descriptive of those temporary storage locations containing references to dynamically-allocated memory in the context of each function in a calling hierarchy of functions of a respective of said plural threads is ascertainable by a memory reclamation component for use in defining a root set of references to said dynamically-allocated memory.

7. A method of coordinating garbage collection with execution of a multi-threaded mutator, wherein said garbage collection is performed at safe points in an execution trajectory of said multi-threaded mutator, and wherein potentially inconsistent threads of said multi-threaded mutator are suspended at said safe points to facilitate said garbage collection, said method comprising:

upon a start garbage collection event, suspending said potentially inconsistent threads of said multi-threaded mutator and modifying corresponding processor data structures to trigger exceptions upon one of a call and a return from respective current functions of said potentially inconsistent threads;

resuming said potentially inconsistent threads;

upon each of said exceptions, suspending each of said potentially inconsistent threads that is corresponding to each of said exceptions; and performing said garbage collection after each of said potentially inconsistent threads is suspended, wherein said potentially inconsistent threads of said multi-threaded mutator are suspended prior to said modifying said corresponding processor data structures, wherein one of said corresponding processor data structures includes a register window data structure, wherein said modifying said corresponding processor data structures include defining a register state of said register window data structure to mark a next register window as occupied and a previous register window as not valid, wherein said call causes a register window allocation operation that triggers a register window spill exception, and wherein said return causes a register window restore operation that triggers a register window fill exception.

8. A method, as recited in claim 7, wherein said processor data structure includes an register window structure; and wherein said exceptions include ones of register window spill exceptions and register window fill exceptions.

9. A method, as recited in claim 7, wherein said processor data structure includes an activation record stack; and wherein said exceptions include ones of activation record stack overflow exceptions and activation record stack underflow exceptions.

10. A method, as recited in claim 7, wherein said processor data structure includes an activation record stack organized as a circular queue; and wherein said exceptions include ones of activation record spill exception and activation record fill exceptions.

11. An apparatus comprising:

a processor having a plurality of named storage locations;

a plurality of addressable storage locations, wherein a current set of instructions from a program executable on said processor includes an access to one of said addressable storage locations via a reference in one of said named storage locations, execution of said current set of instructions including a safe point coinciding with one of a call and a return in said current set of instructions, wherein a root set identifies said addressable storage locations reachable by said current set of instructions at said safe point; and means for suspending execution of said set of instructions, said suspending means responsive to said one of a call and a return, wherein said suspending means is programmably enableable and imposes essentially no overhead on said executable program when not enabled, wherein said suspending means includes means for triggering and handling an exception.

12. An apparatus, as recited in claim 11, wherein said exception is a register window exception.

13. An apparatus, as recited in claim 11, wherein said exception is an activation record stack exception.

14. An apparatus comprising:

a processor having a plurality of named storage locations;

a plurality of addressable storage locations; and a suspension mechanism responsive to an access by a program executable on said processor to a named storage location outside of a current set associated with a current set of instructions, wherein said access to a named storage location outside of said current set coincides with one of a call and a return in said current set of instructions at which those of said addressable storage locations reachable by said program are ascertainable, and wherein said suspension mechanism is programmably enableable and imposes essentially no overhead on said executable program when not enabled, wherein said program is encoded in media readable by said apparatus and comprises safe points defined therein at one of a call to and a return from callable sets of instructions therein, wherein said current set of instructions includes an access to one of said addressable storage locations via a reference in one of said named storage locations execution of said current set of instructions including one of said safe points, wherein a root set encoded with said program identifies those of said addressable storage locations reachable by said program at said one safe point.

15. An apparatus, as recited in claim 14, further comprising:

a computer readable storage medium encoding a program including said first and said second callable sets of instructions.

16. An apparatus, as recited in claim 14, further comprising:

a computer readable storage medium encoding said set of instructions prepared for execution on said processor.

17. An apparatus, as recited in claim 14, further comprising:

a communications device coupled to said processor for receiving said set of instructions form a communications network.

\* \* \* \* \*

UNITED STATES PATENT AND TRADEMARK OFFICE
CERTIFICATE OF CORRECTION

| | |
|---|---|
| PATENT NO. | : 7,376,940 B1 |
| APPLICATION NO. | : 10/861704 |
| DATED | : May 20, 2008 |
| INVENTOR(S) | : William Bush et al. |

It is certified that error appears in the above-identified patent and that said Letters Patent is hereby corrected as shown below:

On the Title Page, Item (54) and col. 1, lines 1 and 2, replace "THREAD SUSPENSION AND METHOD IN A MULTI-THREADED ENVIRONMENT", with --THREAD SUSPENSION SYSTEM AND METHOD IN A MULTI-THREADED ENVIRONMENT--.

Signed and Sealed this

Twenty-ninth Day of July, 2008

JON W. DUDAS
*Director of the United States Patent and Trademark Office*